(12) United States Patent
Kim et al.

(10) Patent No.: US 9,528,840 B2
(45) Date of Patent: Dec. 27, 2016

(54) METHOD, SYSTEM, AND RECORDING MEDIUM FOR CONNECTING PUBLIC TRANSPORTATION ROUTE SERVICE AND MAP SERVICE

(71) Applicant: NAVER Corporation, Seongnam-si (KR)

(72) Inventors: Hyo Jung Kim, Seongnam-si (KR); Soo-Eui Sung, Seongnam-si (KR); Hyun-Soo Kim, Seongnam-si (KR); HeeJeong Son, Seongnam-si (KR); Rae Na, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 0 days.

(21) Appl. No.: 15/087,196

(22) Filed: Mar. 31, 2016

(65) Prior Publication Data

US 2016/0290818 A1 Oct. 6, 2016

(30) Foreign Application Priority Data

Mar. 31, 2015 (KR) ........................ 10-2015-0045637

(51) Int. Cl.
*G01C 21/34* (2006.01)
*H04L 29/08* (2006.01)
*G01C 21/36* (2006.01)

(52) U.S. Cl.
CPC ....... *G01C 21/3423* (2013.01); *G01C 21/3664* (2013.01); *G01C 21/3667* (2013.01); *H04L 67/18* (2013.01)

(58) Field of Classification Search
CPC ............ G01C 21/3423; G01C 21/3664; G01C 21/3667; H04L 67/18
(Continued)

(56) References Cited

U.S. PATENT DOCUMENTS

2013/0103697 A1* 4/2013 Hill .................. G06F 17/30312
707/748
2013/0245932 A1* 9/2013 Beaurepaire ........... G01C 21/20
701/409
(Continued)

FOREIGN PATENT DOCUMENTS

JP 2013-257233 12/2013
KR 2010-0001017 1/2010
(Continued)

OTHER PUBLICATIONS

Korean Office Action issued on Jun. 30, 2016 by the Korean Patent Office corresponding to Korean patent application No. 10-2015-0045637.

*Primary Examiner* — McDieunel Marc
*Assistant Examiner* — James E Stroud
(74) *Attorney, Agent, or Firm* — Greer Burns & Crain Ltd.

(57) ABSTRACT

Disclosed are a method, system, and recording medium for connecting a public transportation route service and a map service. A map providing method includes providing a mode switching function at a first service that provides a public transportation map and a second service that provides a road map, and switching a service mode to the public transportation map or the road map through interconnection between the first service and the second service in response to executing the mode switching function.

20 Claims, 12 Drawing Sheets

(58) Field of Classification Search
USPC .......................................................... 701/533
See application file for complete search history.

(56) References Cited

U.S. PATENT DOCUMENTS

| | | | | |
|---|---|---|---|---|
| 2014/0062790 | A1* | 3/2014 | Letz | .................... H04L 67/1095 |
| | | | | 342/386 |
| 2014/0309813 | A1* | 10/2014 | Ricci | ........................ B60Q 1/00 |
| | | | | 701/2 |
| 2015/0024711 | A1* | 1/2015 | Stob | ........................ H04W 4/02 |
| | | | | 455/411 |
| 2016/0127529 | A1* | 5/2016 | Kim | .................... H04M 1/6075 |
| | | | | 455/418 |
| 2016/0205238 | A1* | 7/2016 | Abramson | ......... G01C 21/3484 |
| | | | | 455/456.4 |
| 2016/0216130 | A1* | 7/2016 | Abramson | ......... G01C 21/3626 |
| 2016/0223347 | A1* | 8/2016 | Ricci | ...................... G01C 21/34 |
| | | | | 701/533 |
| 2016/0246526 | A1* | 8/2016 | Ricci | ...................... G06F 3/0622 |
| 2016/0249181 | A1* | 8/2016 | Taniguchi | ............. H04W 4/028 |
| 2016/0250985 | A1* | 9/2016 | Ricci | ................... B60R 16/0373 |

FOREIGN PATENT DOCUMENTS

| | | |
|---|---|---|
| KR | 10-2010-0021133 | 2/2010 |
| KR | 2010-0061588 | 6/2010 |
| KR | 2012-0004313 | 6/2012 |

* cited by examiner

METHOD, SYSTEM, AND RECORDING MEDIUM FOR CONNECTING PUBLIC TRANSPORTATION ROUTE SERVICE AND MAP SERVICE

CROSS-REFERENCE TO RELATED APPLICATION(S)

This application claims priority under 35 U.S.C. §119 to Korean Patent Application No. 10-2015-0045637, filed on Mar. 31, 2015, in the Korean Intellectual Property Office (KIPO), the entire contents of which are incorporated herein by reference.

BACKGROUND

Field

One or more example embodiments of the present invention relate to technology for providing a public transportation route using, such as, a subway map, a bus map, a road map, and the like.

Description of Related Art

In recent times, a map service is provided in various environments through convergence of Internet communication technology, satellite positioning technology, map information technology, search engine technology, and the like.

In general, the map service may provide a map of a user requested area according to a predefined scale. Since the map service is provided at a portal search service, the map service is used by many users as a search tool.

Further, a navigation system provides a geographic information system (GIS)-based map service through a mobile terminal. The navigation system may be classified into a car navigation system (CNS) configured to provide a route guide associated with active vehicle driving and a personal navigation system (PNS) configured to provide a route guide associated with an operation of a public transportation, such as a subway, a bus, and the like, or a direct travel by walk.

For example, Korean Laid-Open Publication No. 10-2010-0021133, published on Feb. 24, 2010, discloses technology for providing a route guide service of a PNS based on public transportation map information.

SUMMARY

One or more exemplary embodiments of the present invention provide a method, system, and recording medium that enable a user to further easily find a destination.

One or more exemplary embodiments also provide a method, system, and recording medium that may flexibly connect a public transportation route service and a map service.

According to an aspect of the present invention, there is provided a map providing method implemented in a computer. The method includes providing a mode switching function at a first service that provides a public transportation map and a second service that provides a road map, and switching a service mode to the public transportation map or the road map through interconnection between the first service and the second service in response to executing the mode switching function. Switching includes switching the service mode to the second service in response to executing the mode switching function for a first specific point included in the public transportation map, and providing the road map based on the first specific point as a search result about the first specific point, and switching the service mode to the first mode in response to executing the mode switching function for a second specific point associated with a public transportation route on the road map, and providing the public transportation map based on the second specific point as a search result about the second specific point.

The providing may include providing the mode switching function in response to expanding the public transportation map at a maximum level.

The providing may include providing the mode switching function for a specific point in response to selecting the specific point on the public transportation map.

The providing may include providing the mode switching function for each point associated with the public transportation route on the road map.

The providing may include providing the mode switching function for a specific point in response to selecting the specific point associated with the public transportation route on the road map.

The public transportation map may include a route using at least one of a subway, a bus, a train, and an airplane.

The switching may include calling the second service in response to executing the mode switching function for a specific point among points included in a subway map, and switching the service mode from the subway map to the road map based on the specific point in a case in which the public transportation map is the subway map.

The switching may include expanding and thereby providing the road map based on the specific point at a default level or a maximum level.

The switching may include calling the first service in response to executing the mode switching function for a specific point associated with a subway route on the road map, and switching the service mode from the road map to the subway map based on the specific point in a case in which the public transportation map is the subway map.

The switching may include expanding and thereby providing the subway map based on the specific point at a default level or a maximum level.

According to another aspect of the present invention, there is provided a non-transitory computer readable medium storing instructions for a computer system to control connection between services, wherein the instructions control the computer system by a method including providing a mode switching function at a first service that provides a public transportation map and a second service that provides a road map, and switching a service mode to the public transportation map or the road map through interconnection between the first service and the second service in response to executing the mode switching function, and switching includes switching the service mode to the second service in response to executing the mode switching function for a first specific point included in the public transportation map, and providing the road map based on the first specific point as a search result about the first specific point, and switching the service mode to the first mode in response to executing the mode switching function for a second specific point associated with a public transportation route on the road map, and providing the public transportation map based on the second specific point as a search result about the second specific point.

According to still another aspect, there is provided a map providing system including a provider configured to provide a mode switching function at a first service that provides a public transportation map and a second service that provides a road map, and a switcher configured to switch a service mode to the public transportation map or the road map through interconnection between the first service and the second service in response to executing the mode switching function. The switcher is further configured to switch the service mode to the second service in response to executing the mode switching function for a first specific point included in the public transportation map, and to provide the road map based on the first specific point as a search result about the first specific point, and to switch the service mode to the first mode in response to executing the mode switching function for a second specific point associated with a public transportation route on the road map, and to provide the public transportation map based on the second specific point as a search result about the second specific point.

The provider may be further configured to provide the mode switching function in response to expanding the public transportation map at a maximum level.

The provider may be further configured to provide the mode switching function for a specific point in response to selecting the specific point on the public transportation map.

The provider may be further configured to provide the mode switching function for each point associated with the public transportation route on the road map.

The provider may be further configured to provide the mode switching function for a specific point in response to selecting the specific point associated with the public transportation route on the road map.

The switcher may be further configured to call the second service in response to executing the mode switching function for a specific point among points included in a subway map, and to switch the service mode from the subway map to the road map based on the specific point in a case in which the public transportation map is the subway map.

The switcher may be further configured to expand and thereby provide the road map based on the specific point at a default level or a maximum level.

The switcher may be further configured to call the first service in response to executing the mode switching function for a specific point associated with a subway route on the road map, and to switch the service mode from the road map to the subway map based on the specific point in a case in which the public transportation map is the subway map.

The switcher may be further configured to expand and thereby provide the subway map based on the specific point at a default level or a maximum level.

According to at least one exemplary embodiment, it is possible to support a user using a public transportation to easily find a destination by flexibly connecting a public transportation route service and a map service.

Also, according to at least one exemplary embodiment, it is possible to enhance user convenience through a flexible mode switching between services by providing an interaction from a public transportation route service to a map service and an interaction from the map service to the public transportation route service.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
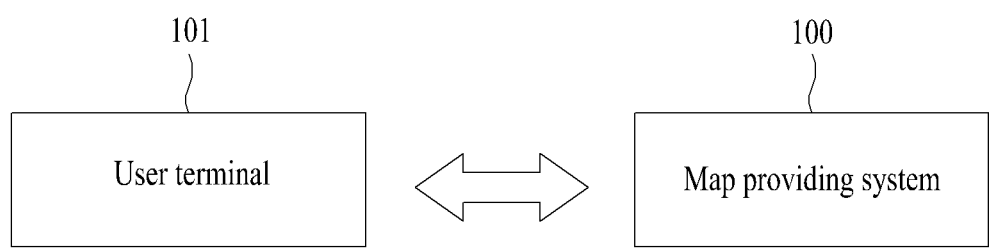
FIG. 1 is a diagram illustrating an environment between a user terminal and a map providing system according to one exemplary embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more exemplary embodiments will be described in detail with reference to the accompanying drawings. Exemplary embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Exemplary embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more exemplary embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program codes, instructions, or some combination thereof, for independently or collectively instructing or configuring a hardware device to operate as desired. The computer program and/or program codes may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the exemplary embodiments, or they may be known devices that are altered and/or modified for the purposes of exemplary embodiments.

A hardware device, such as a computer processing device, may run an operating system (OS) and one or more software applications that run on the OS. The computer processing device also may access, store, manipulate, process, and create data in response to execution of the software. For simplicity, one or more exemplary embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, at least one exemplary embodiment will be described with reference to the accompanying drawings.

The exemplary embodiments relate to technology for providing a public transportation map, a route search, and the like, and may be applicable to a variety of fields, such as a map search service, a location verification service, a route find/route guide service, and the like.

The term "public transportation" used herein may inclusively indicate any type of transportations, such as a subway, a bus, a train, etc., that operate on set schedules, lines, and connections according thereto. Hereinafter, the description will be made by using a subway as a representative example of the public transportation.

A situation in which a user is to visit cafe BBB positioned around station A using a subway may be assumed. In a situation in which a public transportation route service and a map service are not connected, the user searches for required information by searching for a subway route to station A on a subway map using the public transportation route service and by connecting to the map service that provides a road map through a separate route in order to find more information around station A or to find a route from station A to café BBB.

Accordingly, in a situation in which the public transportation route service and the road map service are not connected, a disconnection may occur in a user behavior after arriving at a destination station through search for a route on the subway map. The user is required to go through a complex and inconvenient service enter process in order to acquire more information around the destination station and then to move to the road map service and search again for the corresponding station.

Accordingly, the example embodiments provide a service environment that connects the public transportation route service and the road map service to prevent a disconnection from occurring in a process until the user using a public transportation finds a final destination.

FIG. 1 is a diagram illustrating an environment between a user terminal and a map providing system according to at least one example embodiment. FIG. 1 illustrates a map providing system 100 and a user terminal 101. An indicator with arrowheads indicates that data may be transmitted and received between the map providing system 100 and the user terminal 101 over a wired/wireless network.

The user terminal 101 may be, for example, a personal computer (PC), a laptop computer, a smartphone, a tablet, a wearable computer, and the like, and may refer to any type of terminal devices capable of connecting to a website/mobile site associated with the map providing system 100 or installing and executing a service exclusive application. Here, the user terminal 101 may perform the overall service operation, such as a service screen configuration, a data input, a data transmission and reception, data storage, and the like, under control of the website/mobile site or the exclusive application.

The map providing system 100 serves as a service platform that provides a subway map to the user terminal 101. In particular, the map providing system 100 may support flexible connection between a subway map and a road map to enable switching from a subway map service to a road map service or from the road map service to the subway map service. Here, the road map service may indicate any type of services based on a road or street map, such as a map search service, a position verification service, a route fine/route guide service, and the like. The map providing system 100 may be configured in an application form on the user terminal 101, and without being limited thereto, may be configured to be included in a service platform that provides the subway map service and the road map service in a client-server environment. The map providing system 100 may be configured as a single system with a map service platform or may be configured as a system separate from the map service platform and thereby interact therewith.

Figure 2:
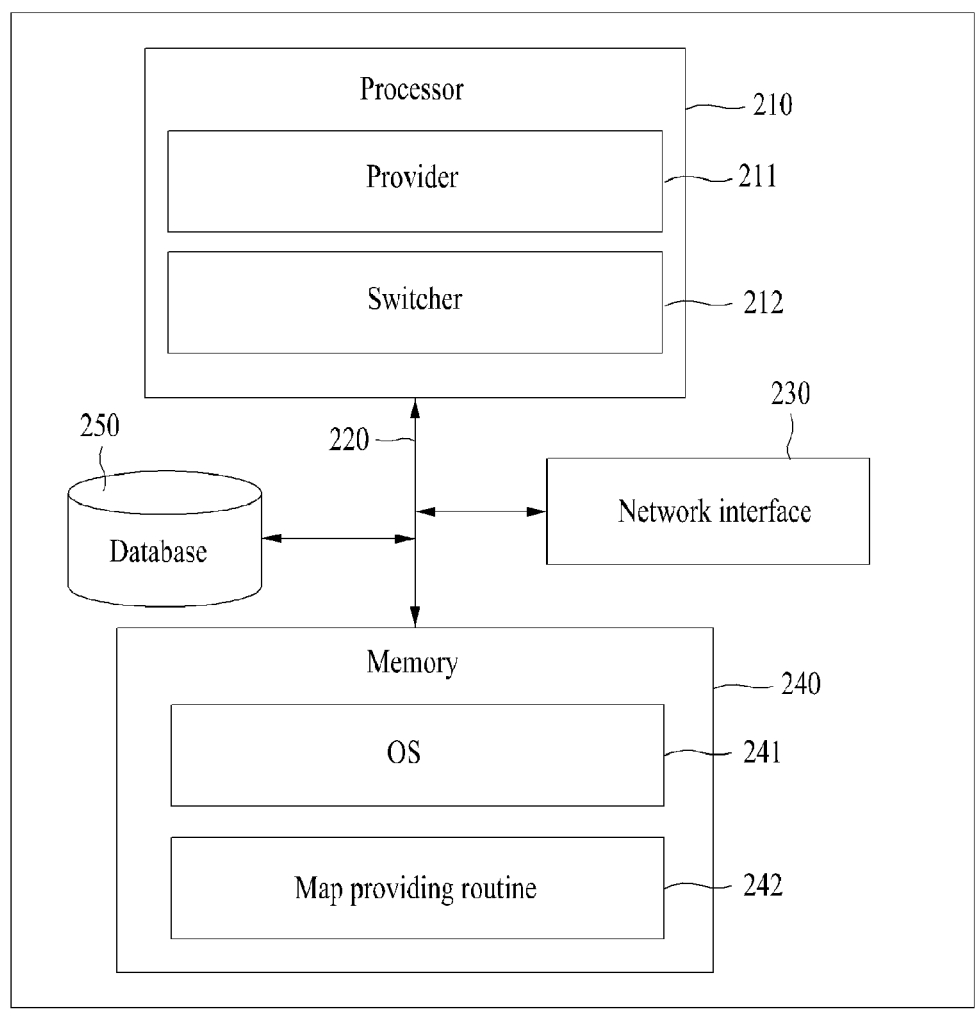
FIG. 2 is a block diagram illustrating a configuration of a map providing system according to one exemplary embodiment.
Figure 3:
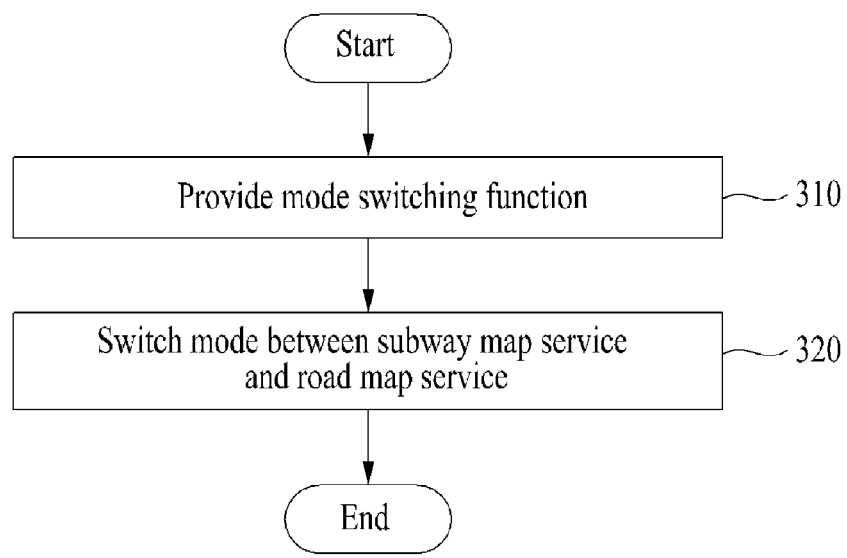
FIG. 3 is a flowchart illustrating a map providing method according to one exemplary embodiment.

FIG. 2 is a block diagram illustrating a configuration of the map providing system 100 according to one exemplary embodiment, and FIG. 3 is a flowchart illustrating a map providing method according to an exemplary embodiment.

Referring to FIG. 2, a map providing system 100 includes a processor 210, a bus 220, a network interface 230, a memory 240, and a database 250. The memory 240 includes an operating system (OS) 241 and a map providing routine 242. The processor 210 includes a provider 211 and a switcher 212. According to other example embodiments, the map providing system 100 may include a greater or less number of constituent elements than the number of constituent elements shown in FIG. 2.

The memory 240 may include a permanent mass storage device, such as random access memory (RAM), read only memory (ROM), a disk drive, etc., as a computer-readable storage medium. Also, program codes (e.g., computer-readable instructions) for the OS 241 and the map providing routine 242 may be stored in the memory 240. Such software constituent elements may be loaded from another computer-readable storage medium separate from the memory 240 using a drive mechanism (not shown). The other computer-readable storage medium may include, for example, a floppy drive, a disc, a tape, a DVD/CD-ROM drive, a memory card, etc. Software constituent elements may be loaded to the memory 240 through the network interface 230 instead of, or in addition to, the computer-readable storage medium.

The bus 220 enables communication and data transmission between the constituent elements of the map providing system 100. The bus 220 may be configured using a high-speed serial bus, a parallel bus, a storage area network (SAN), and/or another appropriate communication technology.

The network interface 230 may be a computer hardware constituent element for connecting the map providing system 100 to the computer network. The network interface 230 may connect the map providing system 100 to the computer network through a wireless and/or wired connection.

The database 250 may serve to store and maintain all of information required to provide a map including public transportation routes. In particular, the database 250 may be constructed such that entire route information for each public transportation, representative information associated with each point included in each route, and details are matched to one another. Although FIG. 2 illustrates that the database 250 is included in the map providing system 100, the database 250 may be present as an external database constructed on a separate system.

The processor 210 may be configured to process computer-readable instructions of a computer program by performing a basic arithmetic operation, a logic operation, and an input/output operation of the map providing system 100. The computer-readable instructions may be provided from the memory 240 and/or the network interface 230 to the processor 210 through the bus 220. The processor 210 may be configured to execute program codes for the provider 211 and the switcher 212. The program codes may be stored in a storage device, such as the memory 240.

The provider 211 and the switcher 212 may be configured to perform operations 310 and 320 of FIG. 3.

In operation 310, the provider 211 provides a mode switching function to enable a service connection between a public transportation route service and a road map service. For example, the provider 211 may provide an interaction for mode switching on a subway route screen and a road map screen. In detail, in the public transportation route service, a mode switching interaction may be provided in an active state based on at least one of a condition that a subway map is expanded at a maximum level and a condition that a specific point/station is selected on the subway map. In the road map service, the mode switching interaction may be provided in an active state for each point, for example, a station, a stop, and the like, (hereinafter, referred to as a station point of interest (POI)) associated with a public transportation route on a road map. Similarly, if a road map screen is expanded at a preset level or more, the mode switching interaction may be displayed for each station POI. In addition, in the road map service, the mode switching interaction may be provided in an active state in response to a selection on a specific station POI on the road map.

In operation 320, the switcher 212 may switch a mode based on an interconnection between the public transportation route service and the road map service, in response to an input of a user command using the mode switching function. That is, the switcher 212 may switch from the subway route screen to the road map screen in response to the mode switching interaction, and may also switch from the road map screen to the subway route screen in response to the mode switching interaction. Here, the switcher 212 may recognize a specific point on the subway map or the road map at which the mode switching interaction is input and may perform mode switching based on the specific point. For example, in response to an input of a mode switching interaction at "Jeongja station" on the subway map, a road map screen based on "Jeongja station" may be provided as a search result about "Jeongja station" through mode switching. Similarly, in response to an input of a mode switching interaction at "Jeongja station" on the road map, a subway route screen based on "Jeongja station" may be provided as a search result about "Jeongja station" through mode switching. To this end, each point included in a subway route and each point, for example, station POI, associated with the subway route on the road map may be matched and thereby stored in the database 250 between the public transportation route service and the road map service.

FIGS. 4 through 7 illustrate examples of a mode switching process between a subway map and a map according to exemplary embodiments.

Figure 4:
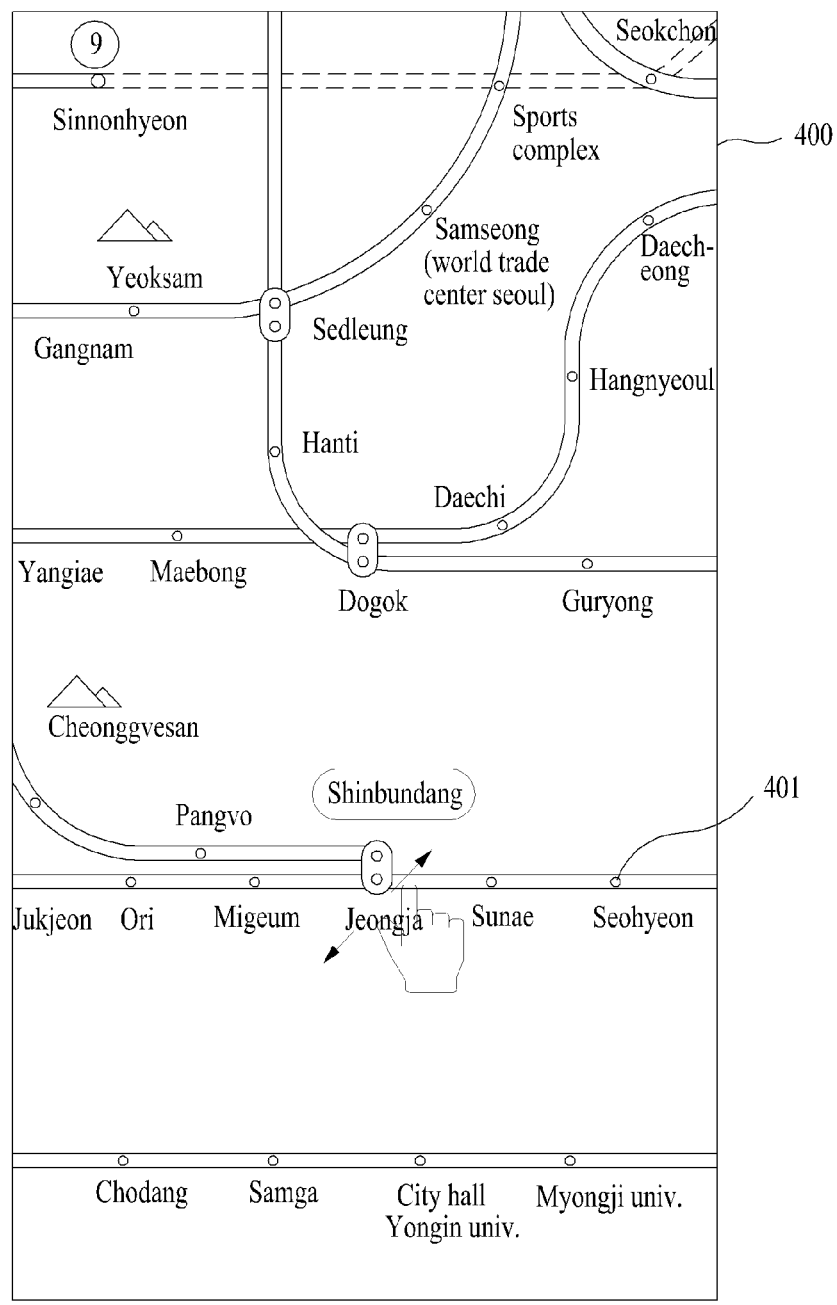
FIGS. 4 through 7 illustrate examples of a mode switching process from a subway map to a road map according to exemplary embodiments.

FIG. 4 illustrates an example of a subway route screen 400 corresponding to a section of a subway route.

Referring to FIG. 4, when the subway route screen 400 is expanded at a maximum level, a mode switching interaction enters into a recognizable active state with respect to each point 401 included in a subway route. For example, the mode switching interaction may be defined as a pinch-to-zoom function. When a pinch-to-zoom is input in a state in which the subway route screen 400 is expanded at the maximum level, the input pinch-to-zoom may be recognized as the mode switching interaction. In addition, a point corresponding to or a point closest to a point at which the pinch-to-zoom is input among the points 401 included in the subway route may be recognized as a selection point for mode switching.

Figure 5:
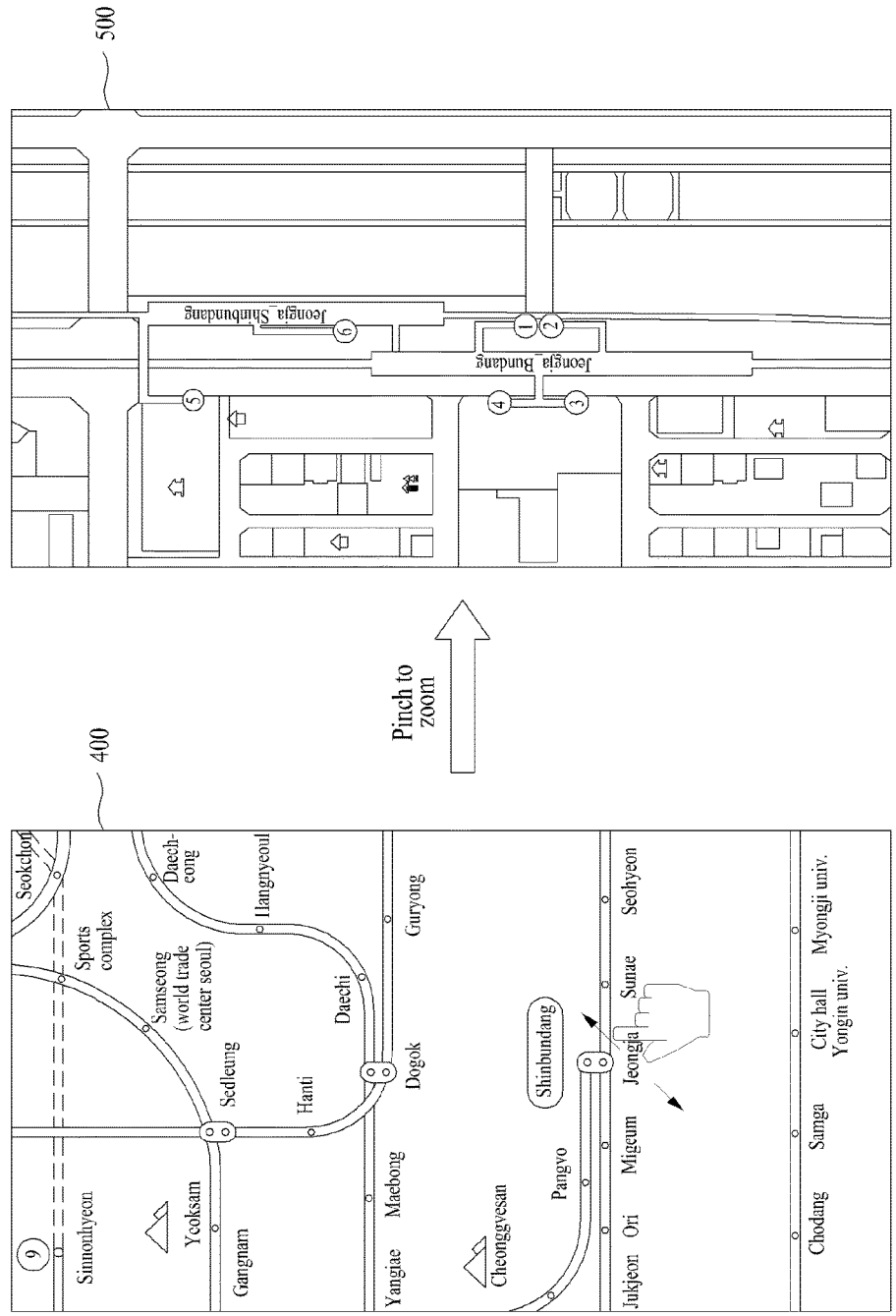

Referring to FIG. 5, in response to an input of a pinch-to-zoom for a specific point on the subway route screen 400, the map service may be initiated and the subway route screen 400 may be switched to a road map screen 500 based on the specific point. For example, in a state in which the subway route screen 400 is maximally expanded, the subway route screen 400 may be switched to the road map screen 500 based on "Jeongja station" in response to the user pinching to zoom "Jeongja station".

Figure 6:
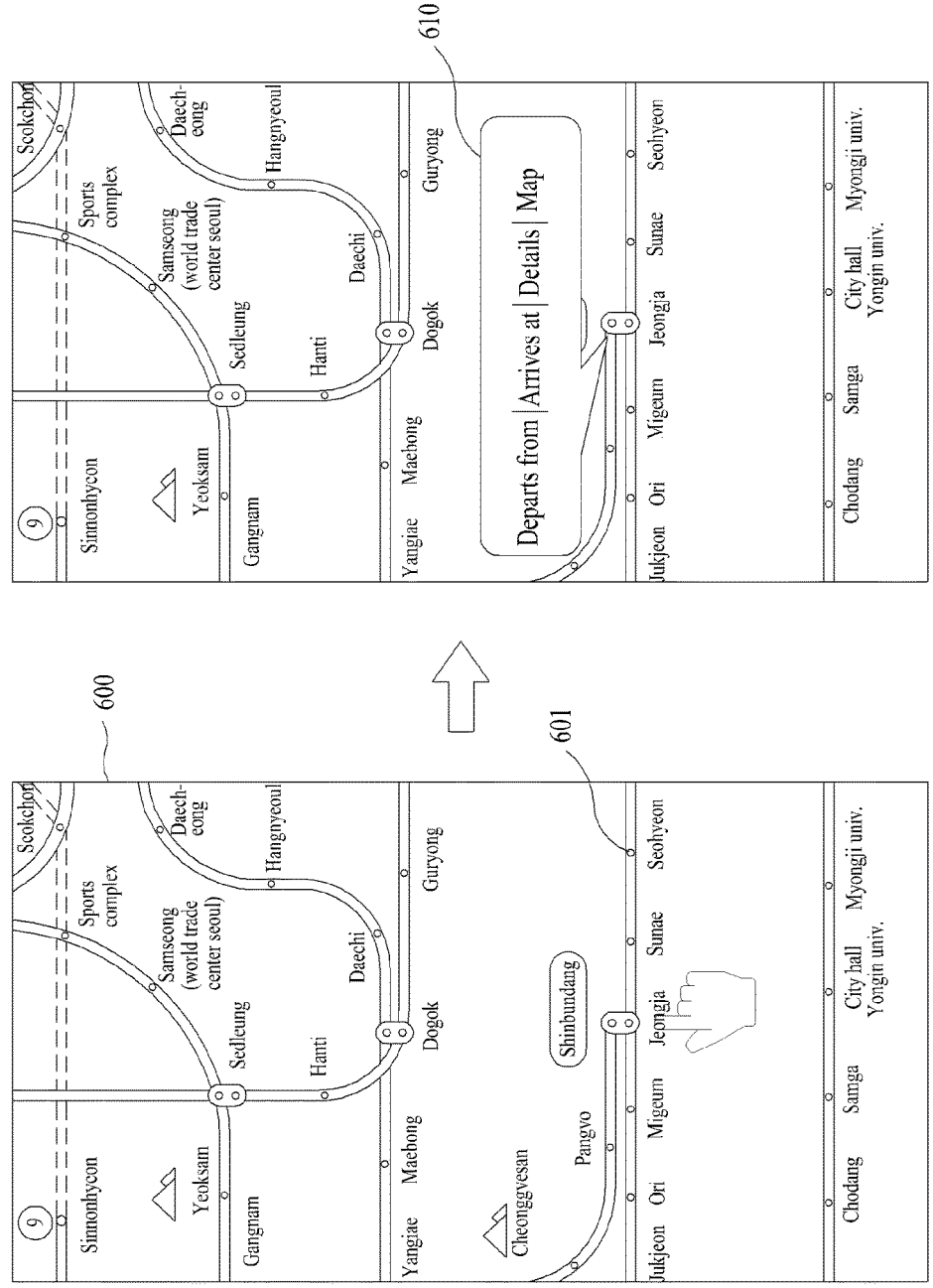

As another example for the mode switching interaction, referring to FIG. 6, a menu list 610 associated with a specific point may be displayed in response to the user selecting the specific point for mode switching from among points 601 included in a subway route on a subway route screen 600. Here, a "map" menu for supporting a mode switching to a map may be included in the menu list 610.

Figure 7:
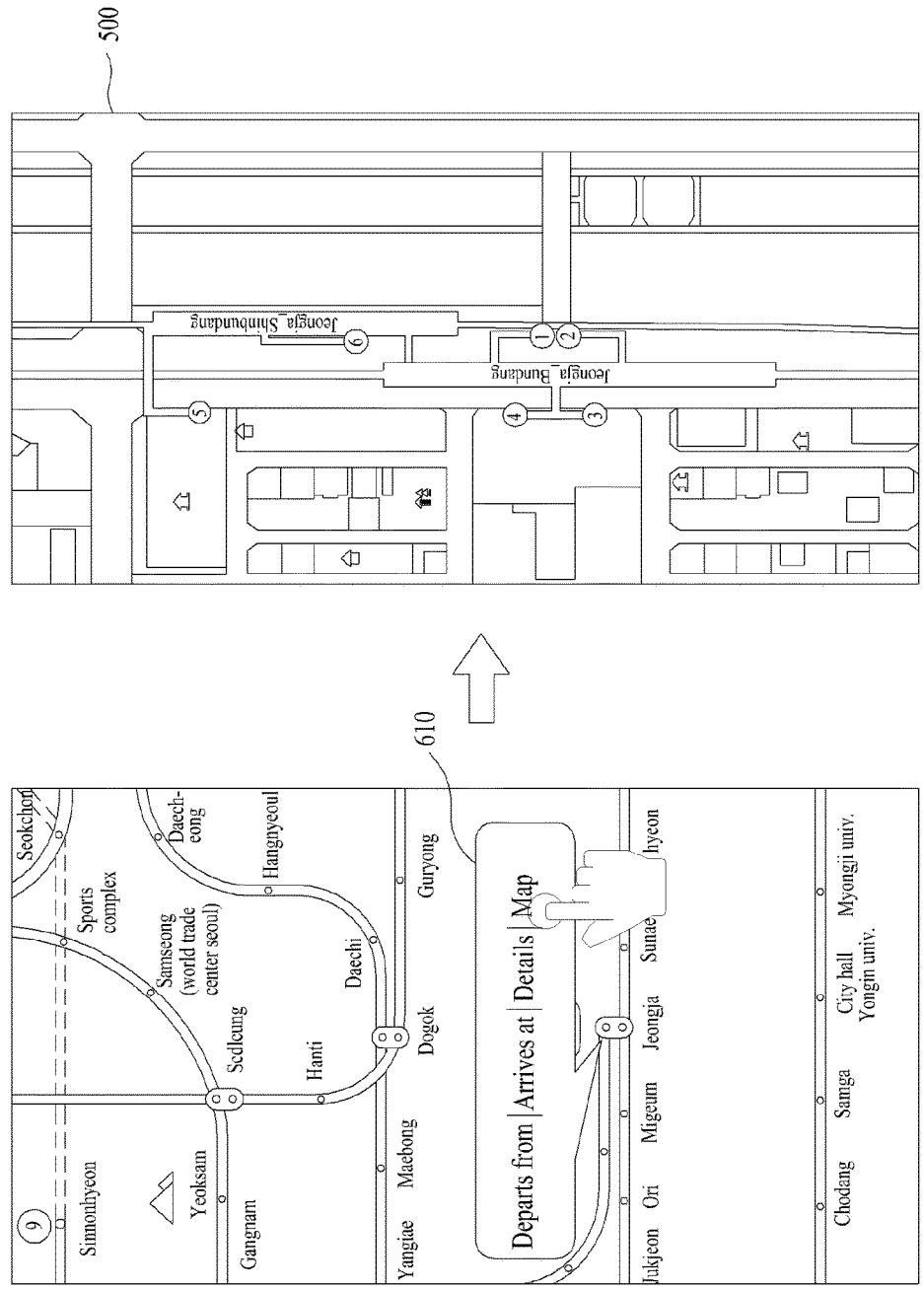

Accordingly, referring to FIG. 7, in response to the user selecting the "map" menu on the menu list 610 displayed by selecting "Jeongja station" on the subway route, a screen may be switched to the road map screen 500 based on "Jeongja station".

Accordingly, in response to inputting a mode switching interaction at a specific station on the subway map, a position of the specific station may be displayed on a road map screen in a road map service. Functions of the road map service, such as finding a route to a final destination, a destination search, and the like, may be flexibly connected.

Figure 8:
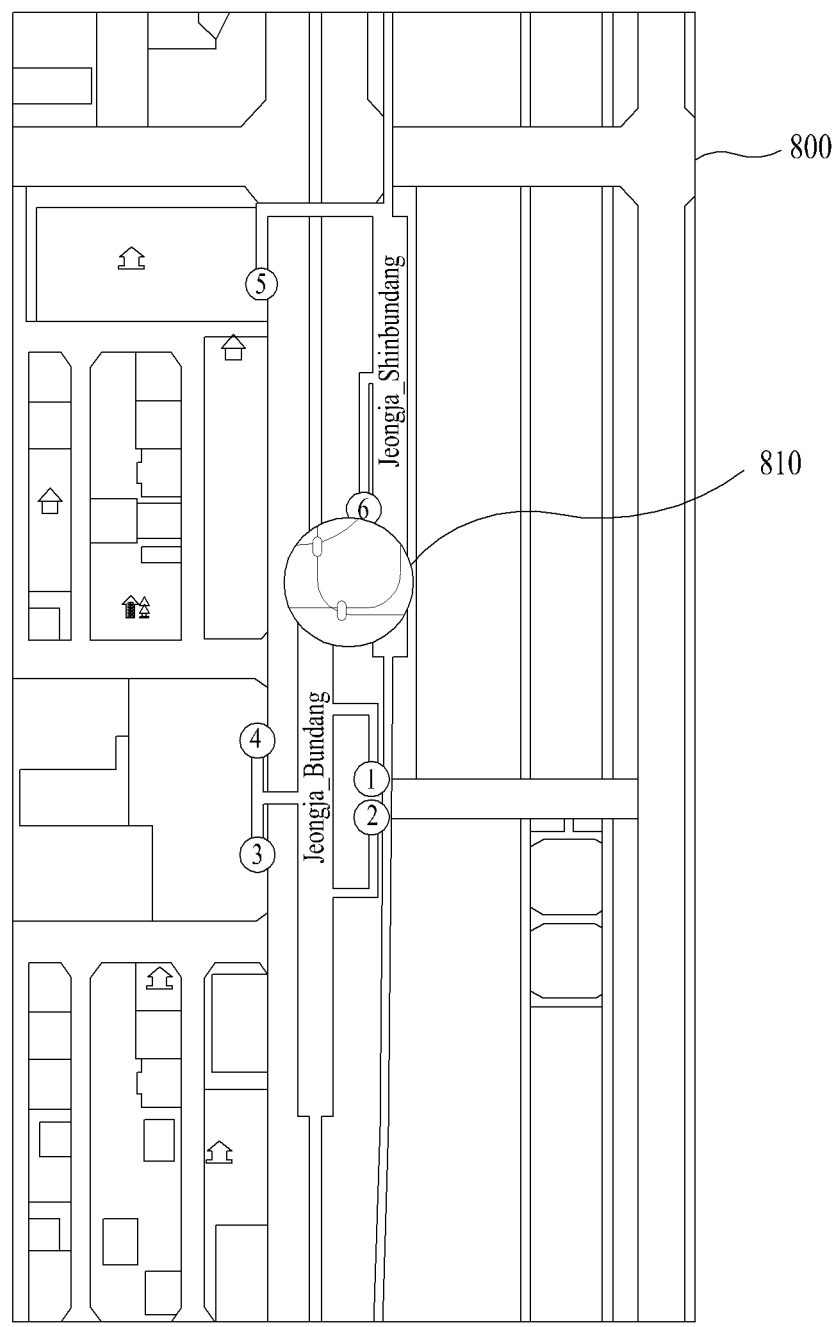
FIGS. 8 through 11 illustrate examples of a mode switching process from a road map to a subway map according to exemplary embodiments.

FIG. 8 illustrates an example of a road map screen 800 including a point, for example, a station POI associated with a subway route.

Referring to FIG. 8, when the point, for example, the station POI, associated with the subway route is displayed on the road map screen 800, a menu button 810 for mode switching may be displayed in an active state at the point. For example, the menu button 810 may be displayed for each point associated with the subway route on the road map screen 800. As another example, in response to switching from the subway route to the road map screen 800 through mode switching, the menu button 810 for mode switching may be displayed only at a point matched to the specific point selected on the subway route. When the road map screen 800 is activated through another method instead of mode switching, the menu button 810 for mode switching may be displayed at all of the points on the road map screen 800 associated with the subway route.

Figure 9:
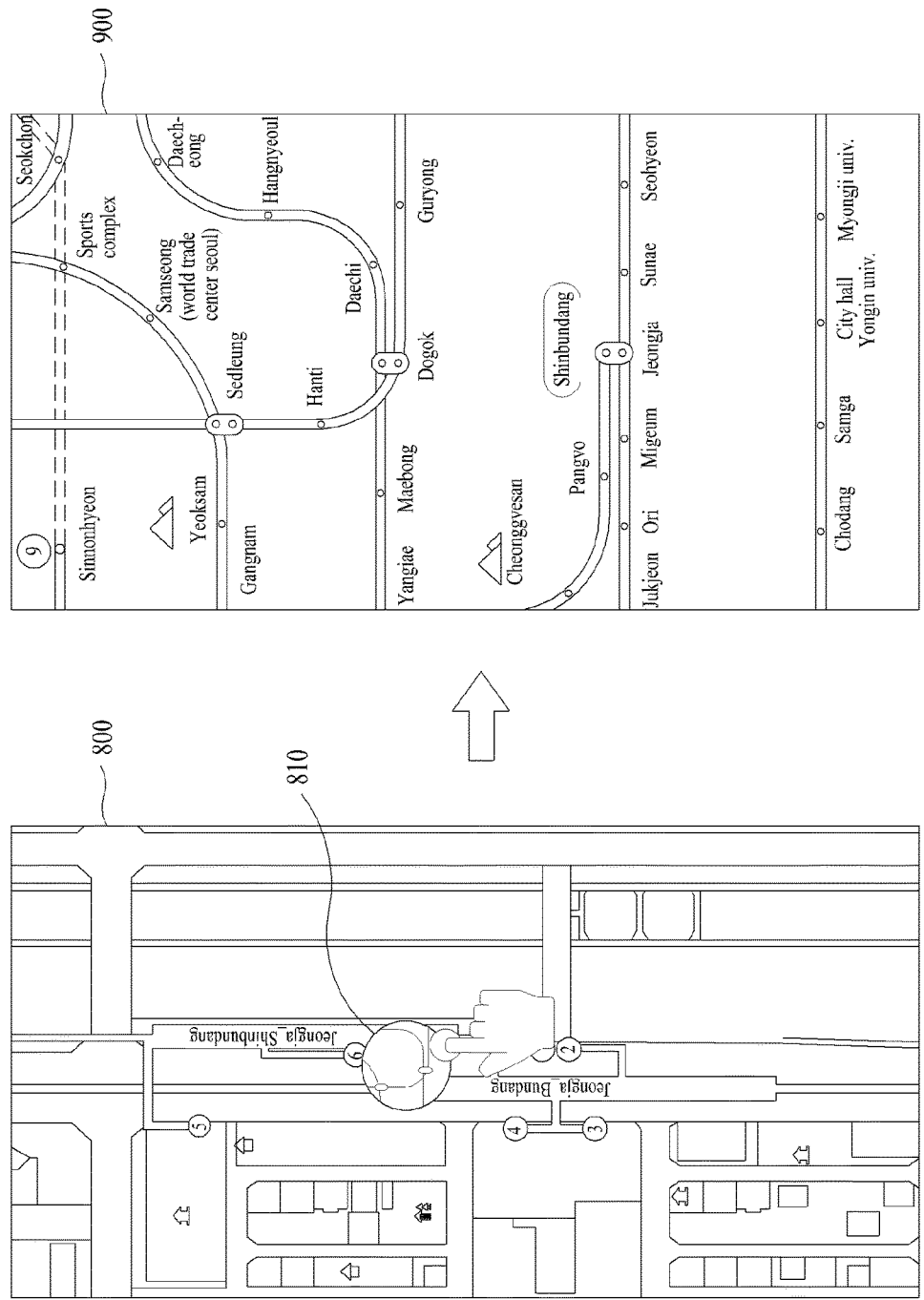

Referring to FIG. 9, in response to an input of the mode switching menu button 810 displayed at the point associated with the subway route on the road map screen 800, the road map screen 800 is be switched to a subway route screen 900 based on the point by entering into the public transportation route service. For example, in response to an input of the menu button 810 for mode switching displayed at "Jeongja station" on the road map screen 800, the road map screen 800 may be switched to the subway route screen 900 based on "Jeongja station". Here, the subway route screen 900 may be expanded at a default level or a maximum level and thereby serviced.

Figure 10:
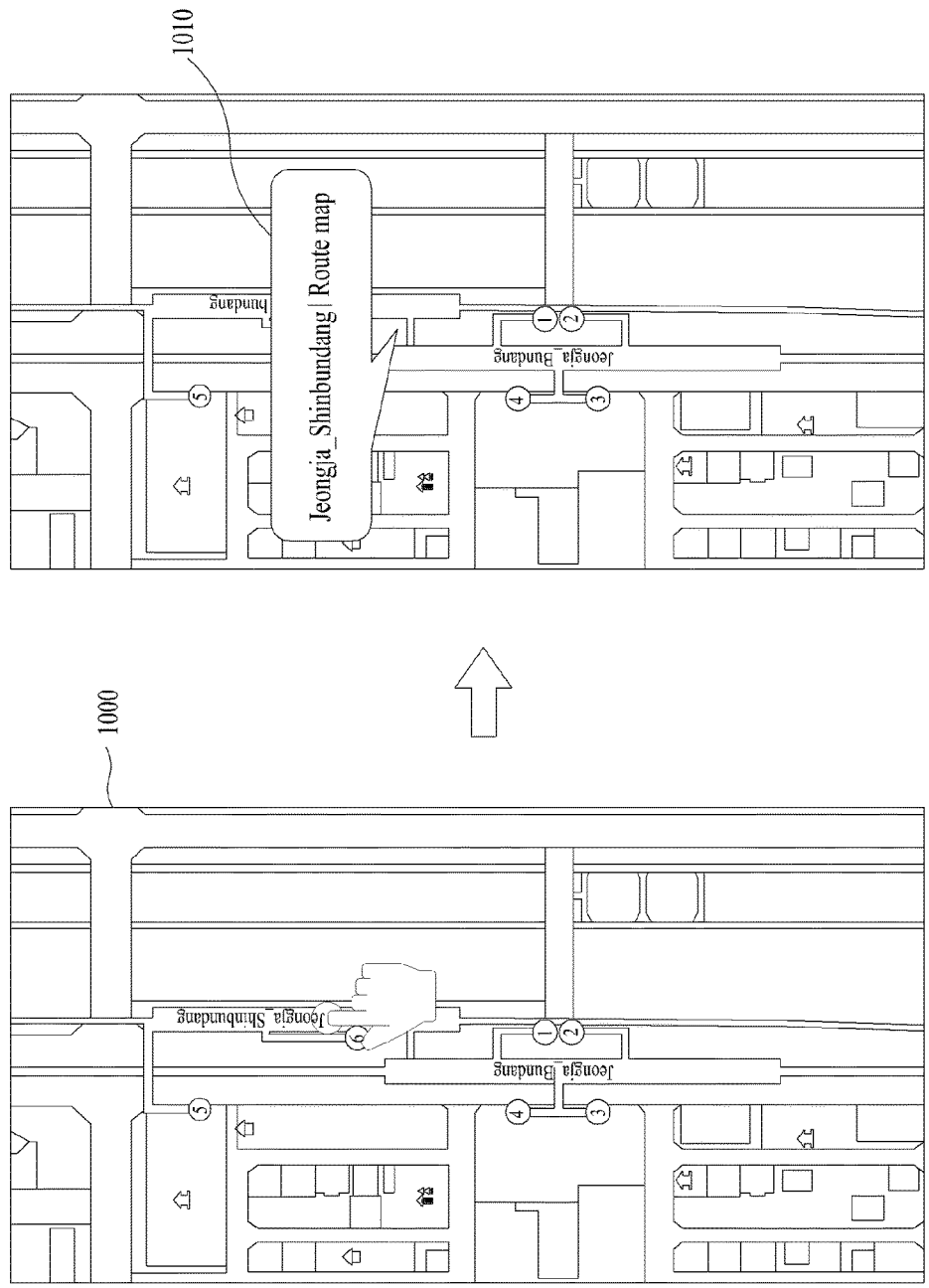

Similarly, as another example of the mode switching interaction, referring to FIG. 10, in response to the user selecting a specific point associated with a subway route on a road map screen 1000, a menu list 1010 may be displayed at the selected specific point. Here, a "route map" menu supporting mode switching to a public transportation map may be included in the menu list 1010.

Figure 11:
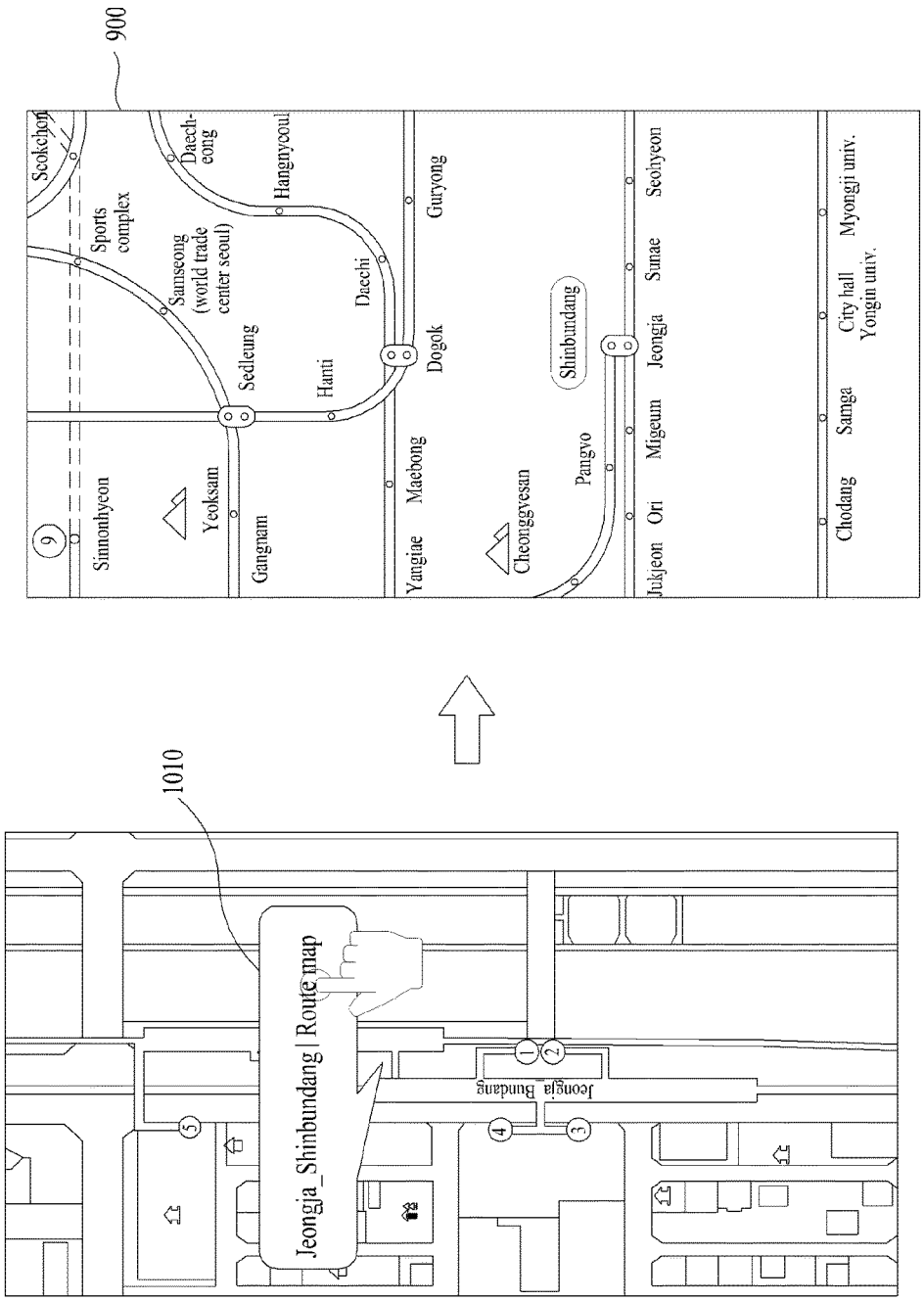

Referring to FIG. 11, in response to the user selecting the "route map" menu from the menu list 1010 displayed by selecting "Jeongja station" on the map, a screen may be switched to the subway route screen 900 based on "Jeongja station".

Accordingly, in response to selecting a mode switching interaction to a subway station on a road map, a subway map based on the subway station may be provided to the user so that the user may return to the public transportation route service and use the provided subway map for a route search and the like.

According to example embodiments, it is possible to support a user to acquire required information without experiencing disconnection between a public transportation map and a road map when finding a final destination by flexibly connecting a public transportation route service and a road map service.

The map providing method includes a further reduced number of operations or additional operations based on the detailed description made above with reference to FIGS. 1 through 11. Also, two or more operations may be combined and orders or positions of the operations may be changed.

The screens of FIGS. 4 through 11 are illustrated to help with the understanding of the present invention, and without being limited thereto, a screen configuration, order, and the like, may be modified.

Figure 12:
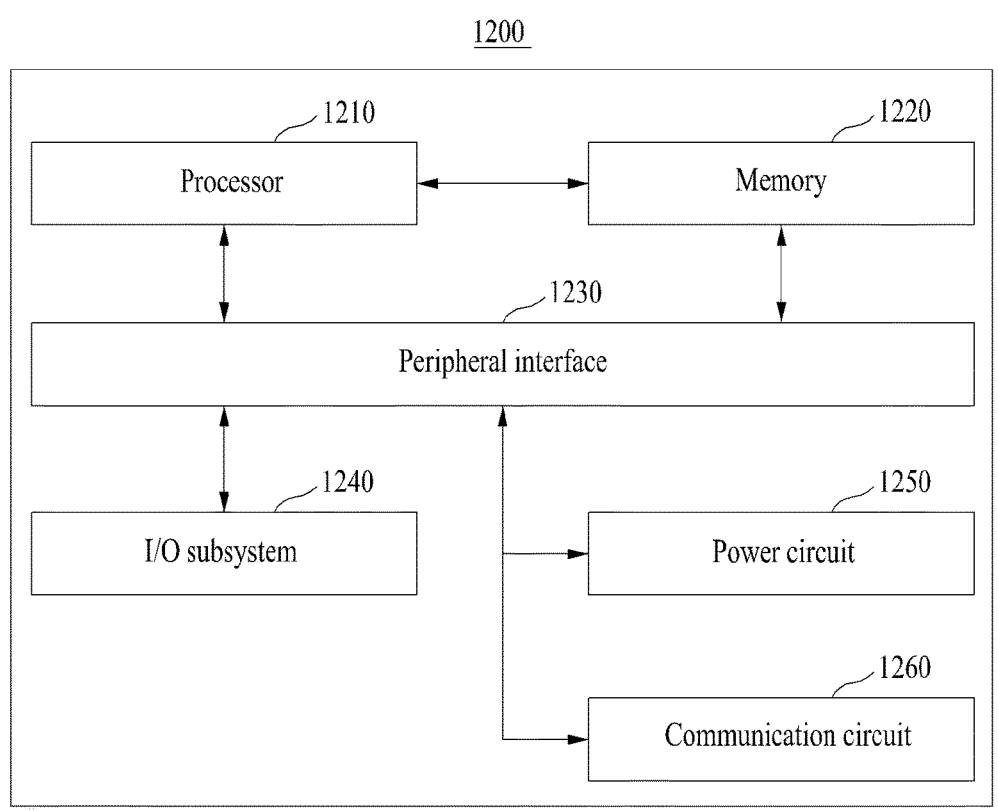
FIG. 12 is a block diagram illustrating a computer system according to one exemplary embodiment.

FIG. 12 is a block diagram illustrating an example of a computer system according to an exemplary embodiment.

Referring to FIG. 12, a computer system 1200 may include at least one processor 1210, a memory 1220, a peripheral interface 1230, an input/output (I/O) subsystem 1240, a power circuit 1250, and a communication circuit 1260. The computer system 1200 may correspond to the user terminal 100.

The memory 1220 may include, for example, a high-speed random access memory (HSRAM), a magnetic disk, a static random access memory (SRAM), a dynamic RAM (DRAM), read only memory (ROM), a flash memory, and a non-volatile memory. The memory 1220 may also include a software module, an instruction set, or a variety of data required for an operation of the computer system 1200. Here, an access from another component, such as the processor 1210 and the peripheral interface 1230, to the memory 1220 may be controlled by the processor 1210.

The peripheral interface 1230 couples an input device and/or output device of the computer system 1200 with the processor 1210 and the memory 1220. The processor 1210 may perform a variety of functions for the computer system 1200 and process data by executing the software module or the instruction set stored in the memory 1220.

The I/O subsystem 1240 couples various I/O peripheral devices with the peripheral interface 1230. For example, the I/O subsystem 1240 may include a controller for coupling the peripheral interface 1230 and a peripheral device, such as a monitor, a keyboard, a mouse, a printer, and a touch screen or a sensor, depending on a necessity. The I/O peripheral devices may be coupled with the peripheral interface 1230 without using the I/O subsystem 1240.

The power circuit 1250 supplies power to all of or a portion of components of a terminal. For example, the power circuit 1250 may include a power management system, at least one power source such as a battery and alternating circuit (AC), a charge system, a power failure detection circuit, a power converter or inverter, a power status indicator, or other components for creating, managing and distributing power.

The communication circuit 1260 enables communication with another computer system using at least one external port. Alternatively, as described above, the communication circuit 1260 may enable communication with another computer system by including a radio frequency (RF) circuit and thereby transmitting and receiving an RF signal known as an electromagnetic signal.

The embodiment of FIG. 12 is only an example of the computer system 1200. The computer system 1200 may have a configuration or an arrangement for omitting a portion of the components illustrated in FIG. 12, further including components not illustrated in FIG. 12, or coupling two or more components. For example, a computer system for a communication terminal of a mobile environment may further include a touch screen, a sensor, and the like, in addition to the components of FIG. 12. A circuit for RF communication using a variety of communication methods, for example, wireless fidelity (Wi-Fi), 3rd generation (3G), long term evolution (LTE), Bluetooth, near field communication (NFC), and ZigBee, may be included in the communication circuit 1260. Components includable in the computer system 1200 may be configured as hardware that includes an integrated circuit specified for at least one signal processing or application, software, or a combination of hardware and software.

The methods according to exemplary embodiments may be configured in a program instruction form executable through a variety of computer systems and thereby recorded in non-transitory computer-readable media. In particular, the program according to the example embodiments may be configured as a PC-based program or an application exclusive for a mobile terminal. Also, the application may be installed in a user terminal through a file provided from the file distribution system. For example, the file distribution system may include a file transmitter (not shown) to transmit the file in response to a request from the user terminal.

According to at least one exemplary embodiment, it is possible to support a user using a public transportation to further easily find a destination by flexibly connecting a public transportation route service and a road map service. Also, according to at least one exemplary embodiment, it is possible to enhance user convenience through a flexible mode switching between services by providing an interaction from a public transportation route service to a road map service and an interaction from the road map service to the public transportation route service.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A map providing method implemented in a computer, the method comprising:
    providing a mode switching function in a first service that provides a public transportation map and in a second service that provides a road map; and
    switching a service mode to the public transportation map or the road map through interconnection between the first service and the second service in response to the mode switching function being executed,
    wherein the switching comprises:
    switching the service mode to the second service in response to the mode switching function for a first specific point included in the public transportation map being executed, and providing the road map based on the first specific point as a search result about the first specific point; and
    switching the service mode to the first service in response to the mode switching function for a second specific point associated with a public transportation route on the road map being executed, and providing the public transportation map based on the second specific point as a search result about the second specific point.

2. The method of claim 1, wherein the mode switching function is provided in response to expanding the public transportation map at a maximum level.

3. The method of claim 1, wherein the mode switching function is provided for the first specific point on the public transportation map in response to the first specific point being selected.

4. The method of claim 1, wherein the mode switching function is provided for each point associated with the public transportation route on the road map.

5. The method of claim 1, wherein the mode switching function is provided for the second specific point associated with the public transportation route on the road map in response to the second specific point being selected.

6. The method of claim 1, wherein the public transportation map comprises a route using at least one of a subway, a bus, a train, and an airplane.

7. The method of claim 1, wherein the switching of the service mode to the second service comprises providing the second service in response to executing the mode switching function for the first specific point among points included in public transportation map, and switching the service mode from a subway map to the road map based on the first specific point in a case in which the public transportation map is the subway map.

8. The method of claim 7, wherein the switching of the service mode to the second service comprises expanding a scale of the road map, and thereby providing the road map based on the first specific point at a default level or a maximum level of enlargement.

9. The method of claim 1, wherein the switching of the service mode to the first service comprises providing the first service in response to executing the mode switching function for the second specific point associated with the public transportation route on the road map, and switching the service mode from the road map to a subway map based on the second specific point in a case in which the public transportation map is the subway map.

10. The method of claim 9, wherein the switching of the service mode to the first service comprises expanding a scale of the subway map, and thereby providing the subway map based on the second specific point at a default level or a maximum level of enlargement.

11. A non-transitory computer readable medium storing instructions for controlling a computer system to provide a map service, the instructions when executed by the computer system performs a method comprising:
    providing a mode switching function in a first service that provides a public transportation map and in a second service that provides a road map; and
    switching a service mode to the public transportation map or the road map through interconnection between the first service and the second service in response the mode switching function being executed, and
    the switching comprises:
    switching the service mode to the second service in response to the mode switching function for a first specific point included in the public transportation map being executed, and providing the road map based on the first specific point as a search result about the first specific point; and
    switching the service mode to the first service in response to the mode switching function for a second specific point associated with a public transportation route on the road map being provided, and providing the public transportation map based on the second specific point as a search result about the second specific point.

12. A map providing system comprising:
    a provider configured to provide a mode switching function in a first service that provides a public transportation map and in a second service that provides a road map; and
    a switcher configured to switch a service mode to the public transportation map or the road map through interconnection between the first service and the second service in response to the mode switching function being executed,
    wherein the switcher is further configured to
    switch the service mode to the second service in response to the mode switching function for a first specific point included in the public transportation map being executed, and to provide the road map based on the first specific point as a search result about the first specific point; and
    switch the service mode to the first service in response the mode switching function for a second specific point associated with a public transportation route on the road map being executed, and to provide the public transportation map based on the second specific point as a search result about the second specific point.

13. The map providing system of claim 12, wherein the provider is further configured to provide the mode switching function in response to expanding the public transportation map at a maximum level.

14. The map providing system of claim 12, wherein the provider is further configured to provide the mode switching function for a first specific point on the public transportation map in response to the first specific point being selected.

15. The map providing system of claim 12, wherein the provider is further configured to provide the mode switching function for each point associated with the public transportation route on the road map.

16. The map providing system of claim 12, wherein the provider is further configured to provide the mode switching function for the second specific point associated with the public transportation route on the road map in response to the second specific point being selected.

17. The map providing system of claim 12, wherein the switcher is further configured to provide the second service in response to executing the mode switching function for the first specific point among points included in the public transportation map, and to switch the service mode from a subway map to the road map based on the first specific point in a case in which the public transportation map is the subway map.

18. The map providing system of claim 17, wherein the switcher is further configured to expand a scale of the road map and thereby provide the road map based on the first specific point at a default level or a maximum level of enlargement.

19. The map providing system of claim 12, wherein the switcher is further configured to provide the first service in response to executing the mode switching function for the second specific point associated with a public transportation route on the road map, and to switch the service mode from the road map to a subway map based on the second specific point in a case in which the public transportation map is the subway map.

20. The map providing system of claim 19, wherein the switcher is further configured to expand a scale of the subway map, and thereby provide the subway map based on the second specific point at a default level or a maximum level of enlargement.

* * * * *